United States Patent
Warner et al.

(10) Patent No.: US 9,393,899 B2
(45) Date of Patent: Jul. 19, 2016

(54) SYSTEM AND METHOD FOR CONTROLLING A LIGHTING AND/OR SIGNALING DEVICE

(71) Applicant: Valeo Lighting Systems North America, LLC, Seymour, IN (US)

(72) Inventors: Gavin Francis Warner, Columbus, IN (US); Oscar Geronimo Longoria Merino, Columbus, IN (US); Paul Richard De Stefano, Seymour, IN (US); Jessica Lee Ellis, Greenwood, IN (US)

(73) Assignee: Valeo North America, Inc., Seymour, IN (US)

( * ) Notice: Subject to any disclaimer, the term of this patent is extended or adjusted under 35 U.S.C. 154(b) by 0 days.

(21) Appl. No.: 14/444,542

(22) Filed: Jul. 28, 2014

(65) Prior Publication Data

US 2016/0023589 A1   Jan. 28, 2016

(51) Int. Cl.
| | |
|---|---|
| *B60Q 1/14* | (2006.01) |
| *B60Q 1/00* | (2006.01) |
| *B60Q 1/48* | (2006.01) |
| *B60Q 1/18* | (2006.01) |
| *B60Q 1/34* | (2006.01) |
| *B60Q 1/28* | (2006.01) |
| *B60Q 1/38* | (2006.01) |

(52) U.S. Cl.
CPC ............ *B60Q 1/0094* (2013.01); *B60Q 1/1423* (2013.01); *B60Q 1/18* (2013.01); *B60Q 1/28* (2013.01); *B60Q 1/34* (2013.01); *B60Q 1/343* (2013.01); *B60Q 1/38* (2013.01); *B60Q 1/48* (2013.01); *B60Q 2300/142* (2013.01); *B60Q 2400/30* (2013.01)

(58) Field of Classification Search
CPC .............................. F21S 48/215; F21S 48/115
USPC ............ 315/77, 82; 307/10.1, 10.8; 362/498, 362/545
See application file for complete search history.

(56) References Cited

U.S. PATENT DOCUMENTS

| | | | |
|---|---|---|---|
| 5,053,677 A | 10/1991 | Sanner et al. | |
| 5,192,930 A | 3/1993 | Brueggemann et al. | |
| 7,019,463 B2 * | 3/2006 | Kesterson | B60Q 1/20 307/10.8 |
| 7,482,756 B2 * | 1/2009 | Kesterson | B60Q 1/2603 307/10.8 |
| 8,764,257 B2 | 7/2014 | de Lamberterie | |
| 8,970,112 B2 * | 3/2015 | Baier | B60Q 1/0094 315/77 |
| 9,121,566 B2 | 9/2015 | de Lamberterie | |

(Continued)

FOREIGN PATENT DOCUMENTS

| | | |
|---|---|---|
| DE | 602005000773 T2 | 1/2008 |
| DE | 102008031078 A1 | 1/2009 |

(Continued)

OTHER PUBLICATIONS

NHTSA Interpretation Letter to Mr. Joe de Sous, dated Mar. 10, 1994.
NHTSA Interpretation Letter to Mr. Kiminori Hyodo, dated Nov. 5, 2005.

*Primary Examiner* — Thuy Vinh Tran
(74) *Attorney, Agent, or Firm* — Jacox, Meckstroth & Jenkins

(57) ABSTRACT

An illumination system for motor vehicles, which contains both parking/daytime running lights of one color and turn signal lights of another color. The invention detects whether parking lights are being displayed and, if so, flashes a parking light alternately with its adjacent turn signal light, rather than constantly illuminating the parking light while flashing the adjacent turn signal light.

6 Claims, 17 Drawing Sheets

(56) References Cited

U.S. PATENT DOCUMENTS

2011/0007518 A1    1/2011    de Lamberterie
2014/0247617 A1    9/2014    de Lamberterie

FOREIGN PATENT DOCUMENTS

| | | |
|---|---|---|
| EP | 2161494 A1 | 3/2010 |
| EP | 2722227 A1 | 4/2014 |

\* cited by examiner

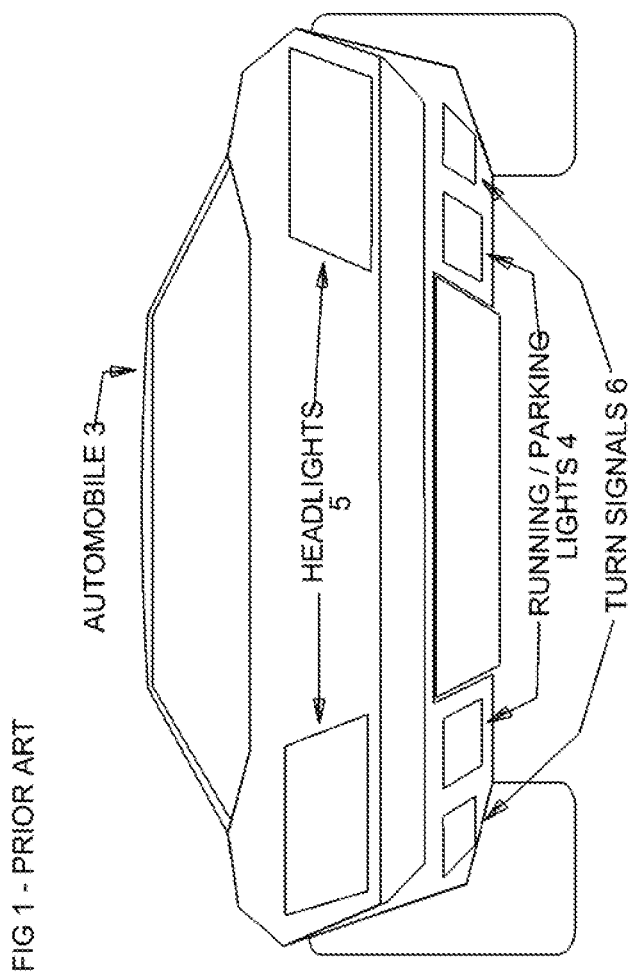

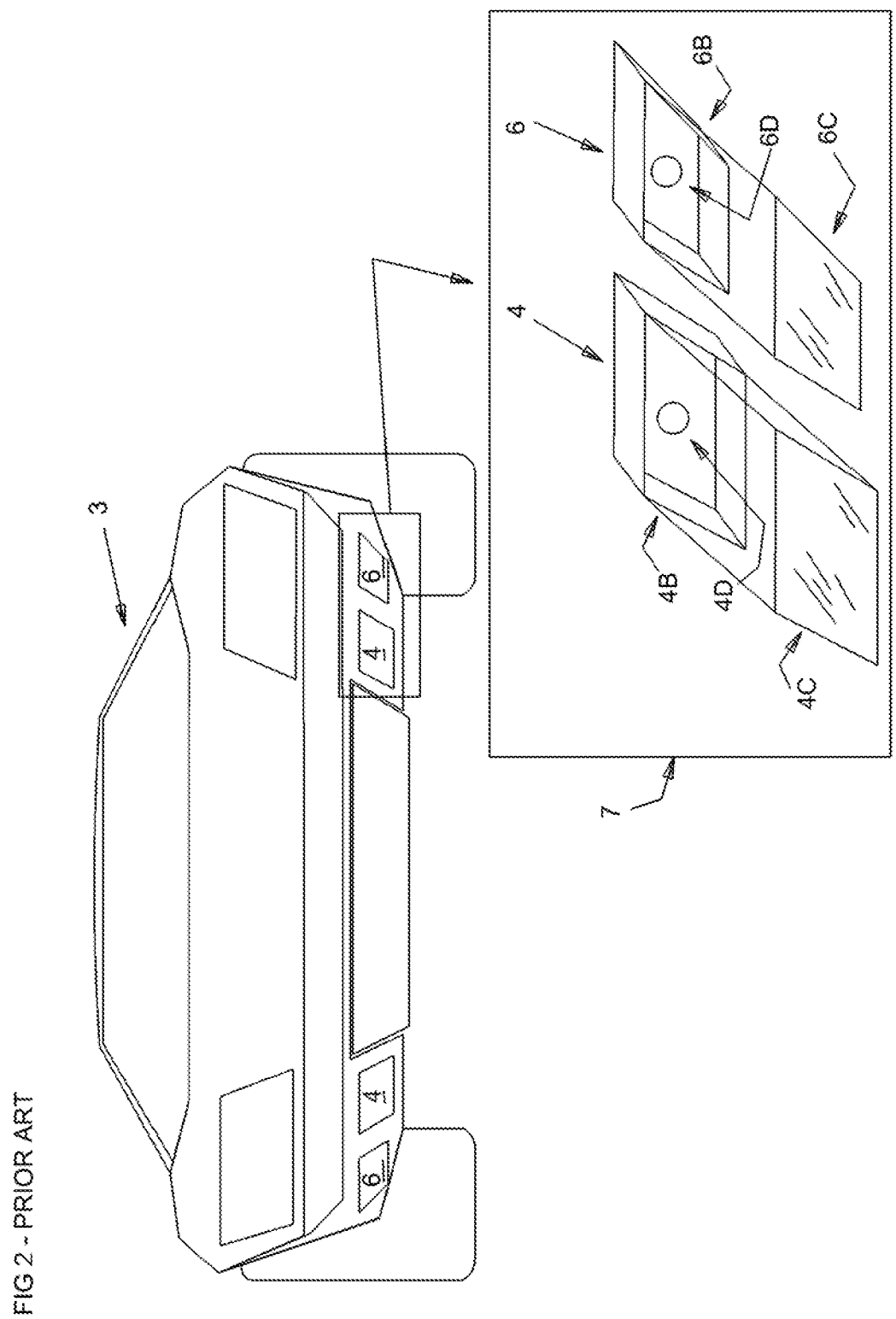

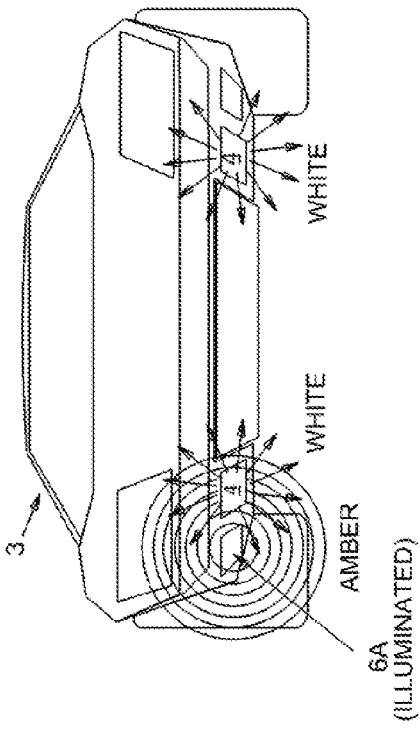
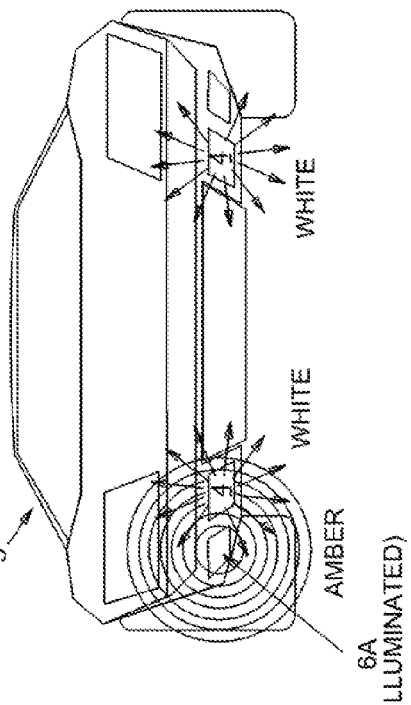
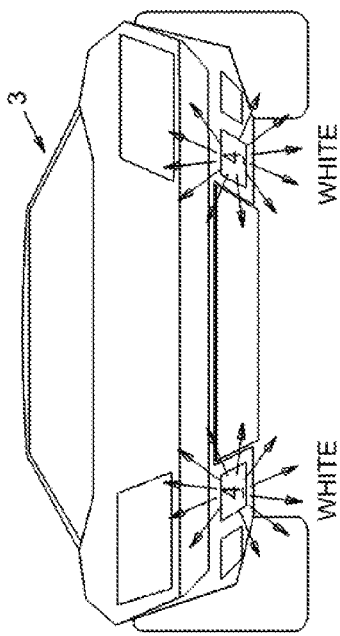
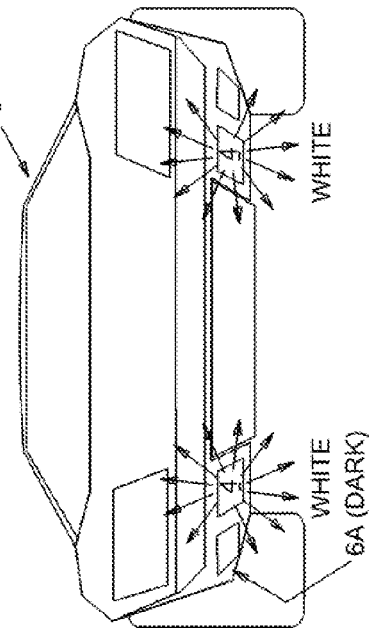

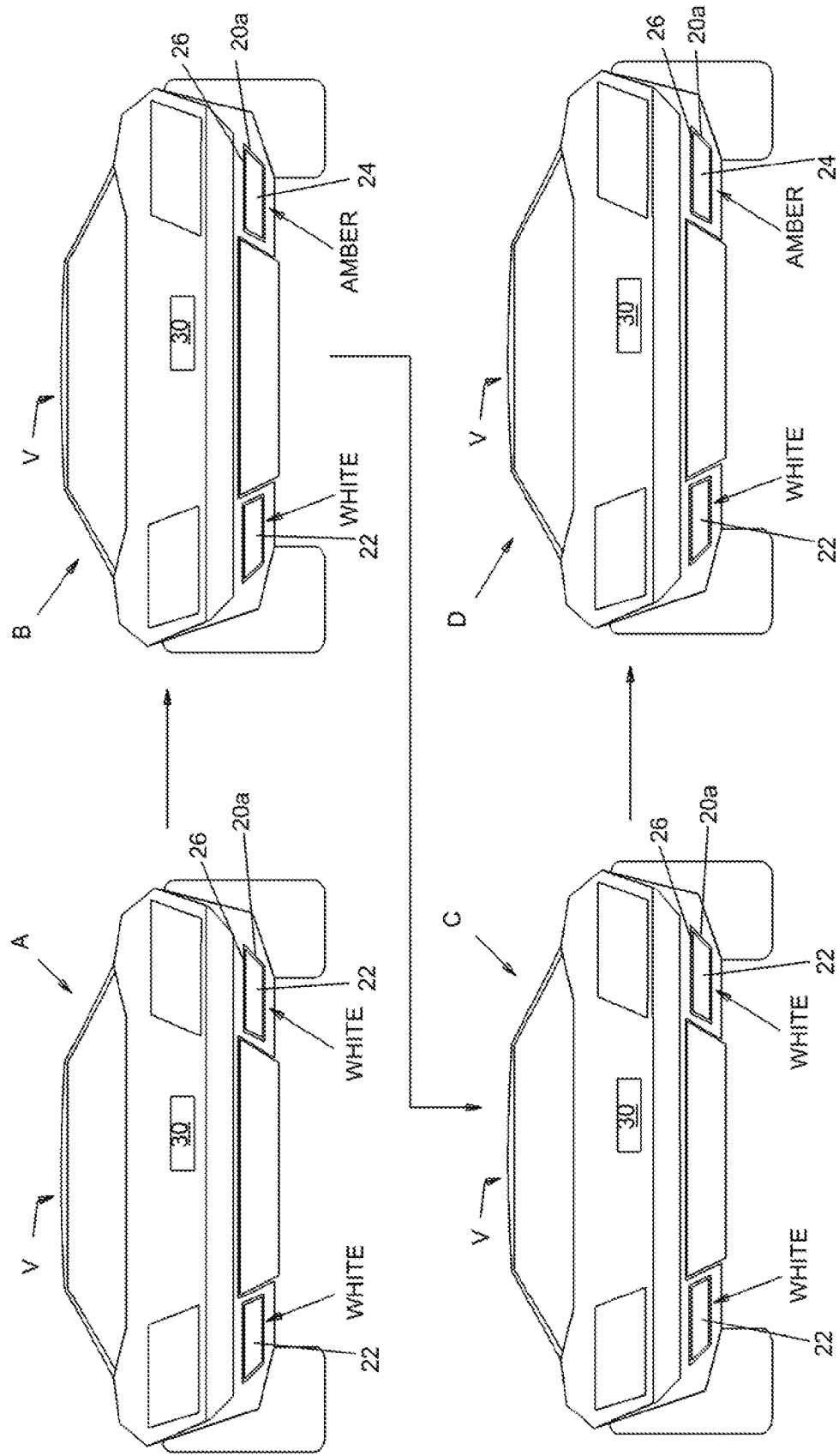

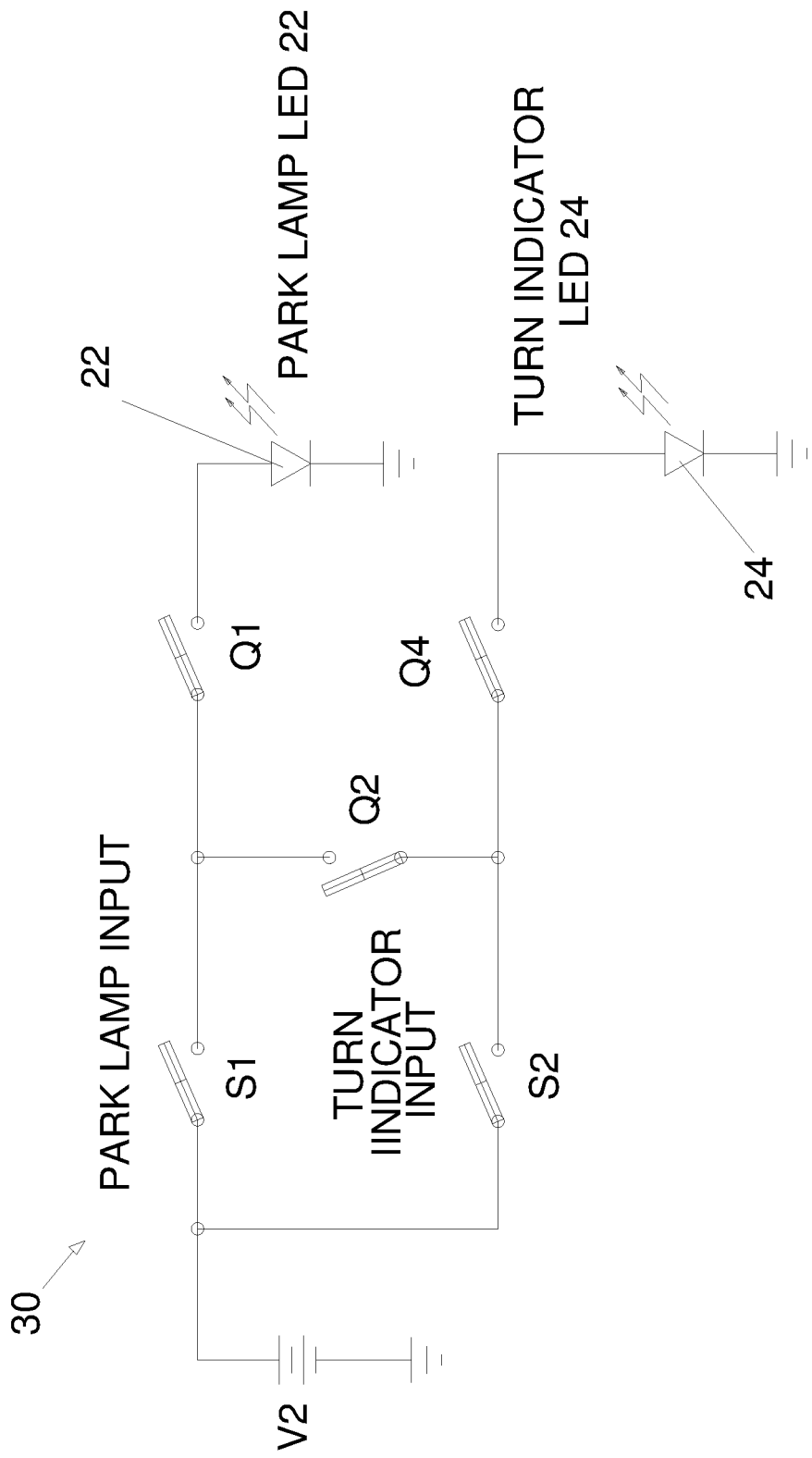

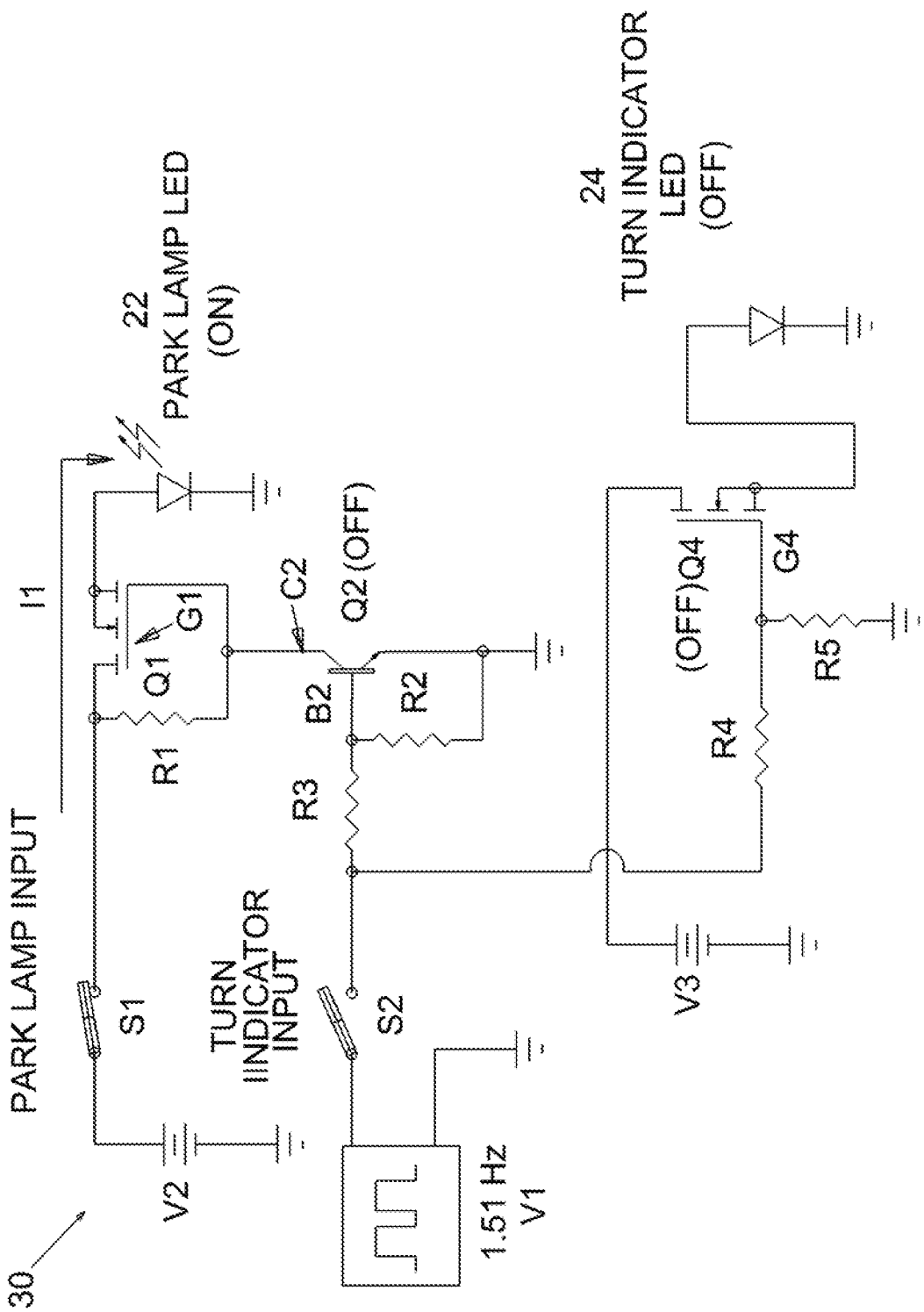

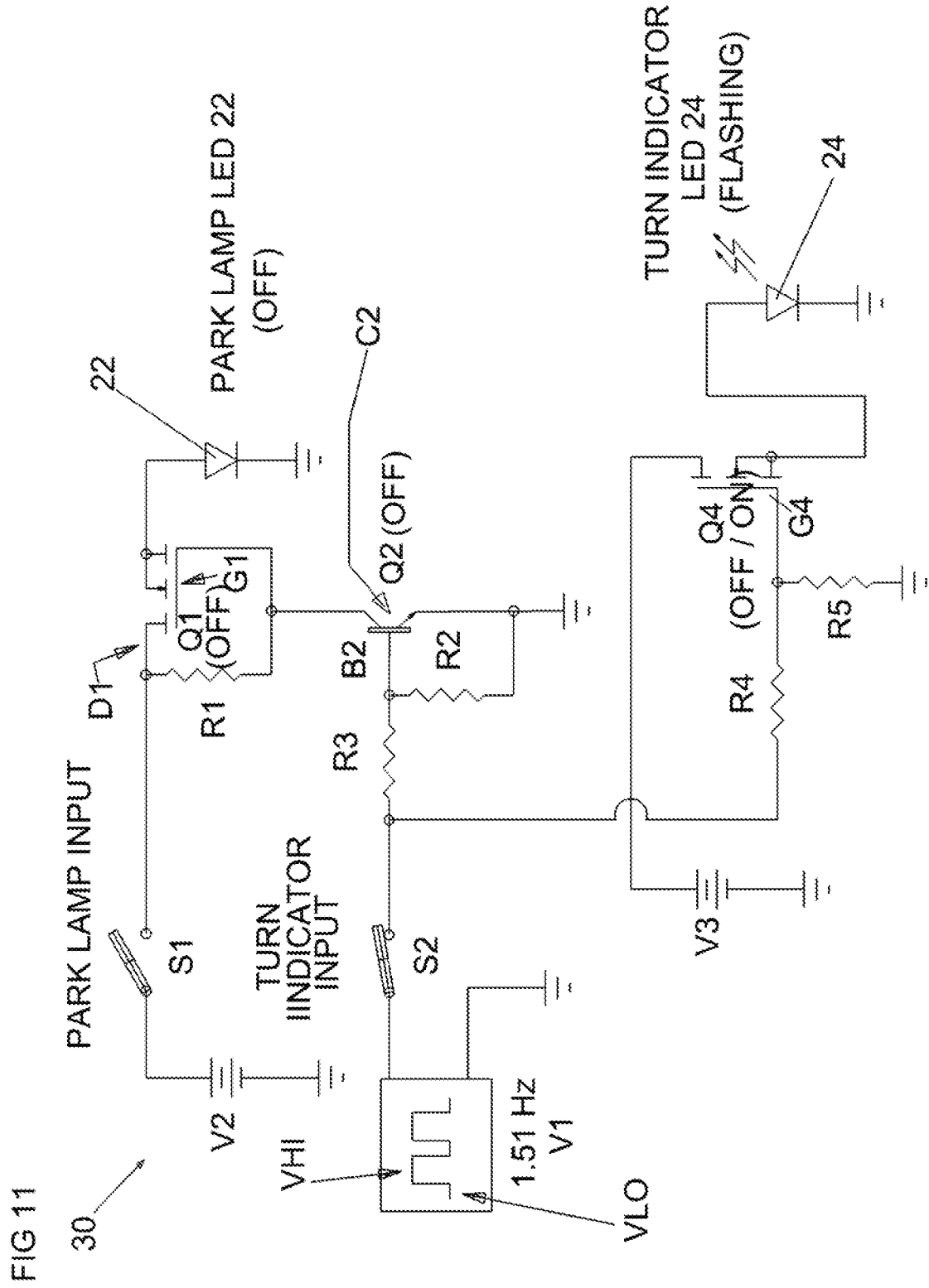

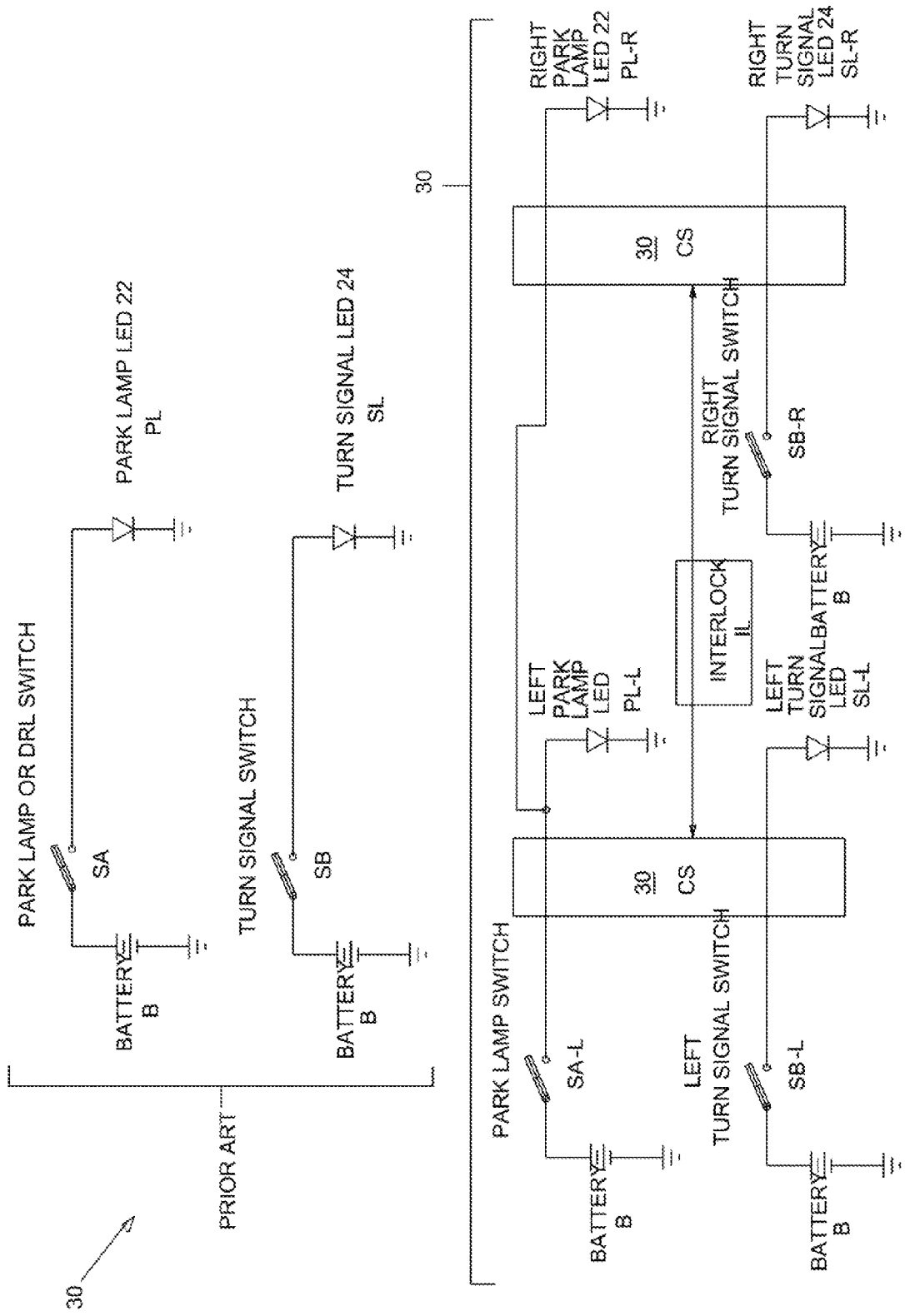

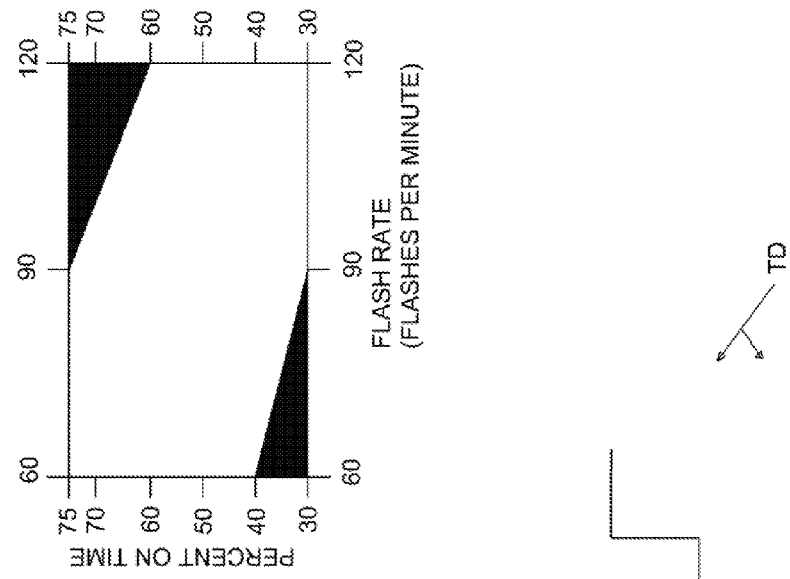
FIG 17
FIG 16A
| SWITCH S1<br>WHITE PARK<br>LIGHT | SWITCH S2<br>AMBER FRONT<br>TURN SIGNAL | OPERATION |
|---|---|---|
| OPEN<br>(STATE A) | OPEN<br>(STATE C) | NONE |
| OPEN<br>(STATE A) | CLOSED<br>(STATE D) | TURN SIGNAL FLASHES<br>NO PARK LIGHTS |
| CLOSED<br>(STATE B) | OPEN<br>(STATE C) | NO TURN SIGNAL<br>PARK LIGHTS ON |
| CLOSED<br>(STATE B) | CLOSED<br>(STATE D) | PARK AND TURN LAMPS<br>ALTERNATE FLASHING |
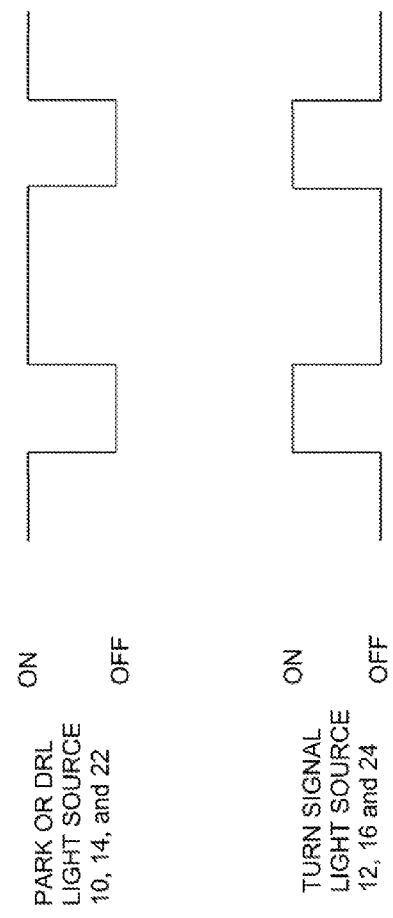
FIG 16B

SYSTEM AND METHOD FOR CONTROLLING A LIGHTING AND/OR SIGNALING DEVICE

BACKGROUND OF THE INVENTION

1. Field of the Invention

This invention relates to a light and/or signaling device for motor vehicles and, more particularly, to a lighting and/or signaling device adapted to control the activation of parking/DRL light and a proximately located turn signal light so that the turn signal light is not diminished by the light from the parking/DRL light.

2. Description of the Related Art

In some vehicle markets, a white park lamp is often combined with an amber front turn signal lamp. This is acceptable because the park lamp is allowed to turn off when the front turn signal is activated. The problem comes about when this same configuration is proposed for the North American market. In North America, once the park lamp is on, it must remain on by regulation. So in the case where a white park lamp and an amber front turn lamp is optically combined, when the front turn lamp turns on, the amber color is diminished due to the white park lamp. This results in a configuration in which the perception is that the park lamp remains on throughout the activation of the front turn, but the turn lamp amber color may not appear as purely amber.

One solution to this problem was that the park lamp was converted to an amber park lamp or the white park lamp was separated from the front turn lamp for the North American market.

FIG. 1 is a front view of a generic vehicle 3. The vehicle 3 is equipped with parking lights 4, which are also used as daytime running lights (DRL). The parking or DRL lights 4 function primarily to make the vehicle 3 more visible to third parties, such as the drivers of other vehicles, during the daytime when functioning as a DRL, and at night when functioning as a parking light and the DRL is a higher intensity function than the parking light function. In other words, it should be understood that the park function is different from the DRL function even though they are they same lamp.

The vehicle 3 is also equipped with headlights 5, which serve a different primary function, namely, to illuminate external objects at night, and make them visible to the person driving vehicle 3. The headlights 5 generally consume more power than do the parking or DRL lights 4. The vehicle 3 is further equipped with turn signals 6, which indicate a direction of an upcoming turn by the vehicle 3.

The parking lights 4 are commonly white in color, and they are often illuminated whenever the vehicle 3 is operational. The turn signals 6 are commonly amber in color, and one of them is illuminated by flashing during a turn, but generally not at other times when the vehicle 3 is being driven.

This particular combination of white parking lights 4 with amber turn signals 6, together with the constant illumination of the white parking lights 4, can affect the visibility of the turn signals 6.

That is, the white light emitted by a parking light 4, which is adjacent to an amber turn signal 6, can dilute, as it were, the light of the amber turn signal 6. This dilution can make the amber turn signal 6 less visible. By analogy, a street lamp in a parking lot will appear very bright at midnight, when it is the only light source present. However, at noon the street light appears far less bright because another light source is present, namely, the sun, which dilutes the light of the street lamp. It may be thought that the dilution of the turn signal can be reduced by extinguishing the white parking lights 4 while the amber turn signal 6 operates. However, government regulations in some localities prohibit this.

In addition, the arrangement of FIG. 1 requires equipment which can be viewed as complex. As the exploded view or inset 7 in FIG. 2 shows, each parking or DRL lights 4 requires a housing 4B, a lens 4C, and a light source 4D, such as a light-emitting diode, or LED. Similarly, each turn signal 6 can require its own housing 6B, its own lens 6C, and its own light source 6D. Additional equipment to that shown in the simplification of FIG. 2 can also be required. All these items add cost and logistical complexity to the manufacturing and assembly of the vehicle 3.

What is needed, therefore, is a signaling and/or lighting system and method that overcomes one or more of the problems in the prior art.

SUMMARY OF THE INVENTION

One object of one embodiment of the invention is to provide an improved lighting and/or signaling system for vehicles.

A further object of one embodiment of the invention is to provide an improved system of turn signals for vehicles.

Still another object is to provide a system and method that optically combines a white park lamp and an amber turn signal lamp in a manner that light from the amber turn signal lamp is not diminished due to the white park lamp.

In one form of one embodiment of the invention, when a driver issues a turn signal, but when parking lights are illuminated, the invention creates a flashing signal comprising a sequence of flashes of white light are interspersed with, or alternate with, a sequence of flashes of amber light, such as white-amber-white-amber etc.

This is accomplished in one aspect of one embodiment of the invention by utilizing two adjacent lights in a particular manner. The adjacent lights are colored white and amber. The procedure can be divided into two steps. In step 1, the invention illuminates the amber light and extinguishes the white light. In step 2, the invention illuminates the white light and extinguishes the amber light. Then steps 1 and 2 are repeated.

In one aspect, one embodiment of the invention comprises a lighting and/or signaling device for a motor vehicle, comprising at least one first light source for producing a first colored light and at least one second light source, a control system which energizes the at least one second light source to produce a blinking or pulsing light in response to a switch or lever being actuated, the blinking or pulsing light having a light on period and a light off period, and energizes the at least one first light source to produce the first colored light during the light off period and does not energize the at least one first light source.

In another aspect, another embodiment of the invention comprises a lighting and/or signaling device for a motor vehicle having a turn signal actuator, operable by a driver of the vehicle, to generate a turn indicator light, said lighting and/or signaling device comprising a plurality of front parking or DRL lights, each of which (1) emits a first colored light, and (2) is located adjacent a respective turn signal light that emits said turn indicator light of a second color that is different from said first colored light, comprising a control system which causes said turn signal light to flash alternately with its adjacent parking or DRL light.

In still another aspect, another embodiment of the invention comprises a lighting and/or signaling device for a motor vehicle which has a left parking or DRL light, a right parking or DRL light, a left turn signal light associated with said left parking or DRL light and a right turn signal light associated with said right parking or DRL light, said lighting and/or signaling device comprising a first signal line which receives a first actuation signal for both right and left parking or DRL lights, a second signal line which receives a second actuation signal for at least one of the right or left turn signal lights, a control which, in response to the first and second actuation signals, causes either (i) said left parking or DRL light and said left turn signal light to flash, but alternately with each other, or (II) said right parking or DRL light and said right turn signal to flash, but alternately with each other.

In yet another aspect, another embodiment of the invention comprises a lighting and/or signaling system for a motor vehicle comprising a) a parking or DRL light source and a turning signal light source on left and right sides of the motor vehicle, b) a first switch (S1) selectively operable by a driver of the motor vehicle to generate either a right turn signal or a left turn signal, c) a control which i) steadily illuminates said parking or DRL light source and does not illuminate said turning signal light source when no turn signal is requested, ii) does not illuminate said parking or DRL light source and alternately illuminates said turning signal light source when said parking or DRL light source is activated and said driver has activated said first switch (S1).

In still another aspect, another embodiment of the invention comprises a lighting and/or signaling device for a motor vehicle, operated by a driver, which contains a left front parking light, a right front parking light, a left front turn signal light, and a right front turn signal light, said lighting and/or signaling device comprising a) a switch by which the driver can use to selectively issue a request for a left turn signal or a right turn signal, b) a control which i) responds to the request for the left turn signal by detecting whether the parking lights are illuminated and A) if not, flashing the left front turn signal light and B) if so, alternately flashing the left front parking light with the left front turn signal light, while maintaining the right front parking light steadily illuminated, and ii) responds to the request for the right turn signal by detecting whether the parking lights are illuminated and, A) if not, flashing the right front turn signal light and B) if so, alternately flashing the right front parking light with the right front turn signal light, while maintaining the left front parking light steadily illuminated.

In still another aspect, another embodiment of the invention comprises a lighting and/or signaling circuit for a motor vehicle, operated by a driver, which contains (1) a left front parking light, (2) a right front parking light, (3) a left front turn signal light, and (4) a right front turn signal light, said lighting and/or signaling circuit comprising a) a first switch (S1L), b) an oscillator (V1L) which produces a pulse train comprising voltage pulses, c) a second switch (S2L) which receives the pulse train, d) a third switch (S2R) which receives the pulse train, e) a first transistor (Q1L) which is induced by closure of the first switch (S1L) to actuate the left front parking light, f) a second transistor (Q1R) which is induced by closure of the first switch (S1L) to actuate the right front parking light, g) a third transistor (Q4L) which is induced by the pulse train when passed by closure of the second switch (S2L) to periodically actuate the left front turn signal light, h) a fourth transistor (Q4R) which is induced by the pulse train when assed by closure of the third switch (S2R) to periodically actuate the right front turn signal light, i) a fourth transistor (Q2L) which is actuated by the pulse train when passed by closure of the second switch (S2L), which shuts off the first transistor (Q1L) when the left front turn signal is actuated, and j) a fifth transistor (Q2R) which is actuated by the pulse train when passed by closure of the third switch (S2R), which shuts off the second transistor (Q1R) when the right front turn signal is actuated.

This invention, including all embodiments shown and described herein, could be used alone or together and/or in combination with one or more of the features covered by one or more of the claims set forth herein, including but not limited to one or more of the features or steps mentioned in the following bullet list and the claims. The lighting and/or signaling device wherein said first colored light is white and said at least one second light source is amber.

The lighting and/or signaling device wherein said at least one first light source and said at least one second light source both comprise at least one semiconductor light source.

The lighting and/or signaling device wherein said at least one first light source comprises a plurality of white parking or DRL light sources at a front of the vehicle, and a plurality of amber light sources, at least one of which is one adjacent each of said plurality of white parking or DRL light sources, and said visual signal is produced by alternately flashing one of said parking or DRL light sources with its adjacent amber light source.

The lighting and/or signaling device wherein said first light source does not produce said first light when said second light sources produces a second color and said second light source does not produce said second light when said first light source produces said first color.

The lighting and/or signaling device wherein each of said plurality of said front parking or DRL light sources comprises at least one LED that generates a white light, and said turn signal light being an LED that generates an amber light, said control system alternately flashing said first colored light from said parking or DRL light source and its adjacent turn indicator light.

The lighting and/or signaling device wherein said parking or DRL light source does not produce said parking or DRL light when said turn signal light produces said turn indicator light and said turn signal light does not produce said turn indicator light when said parking or DRL light source produces said first colored light.

The lighting and/or signaling device in which, when both said first and second actuation signals are present the right and left parking or DRL lights are always illuminated, but either the right or left parking or DRL light is dark when its adjacent right or left turn signal light, respectively, is illuminated.

The lighting and/or signaling circuit in which the left front turn signal light flashes alternately with the left front parking light when second switch (S2L) is closed when the parking lights are illuminated.

The lighting and/or signaling circuit in which the right front turn signal light flashes alternately with the right front parking light when third switch (S2R) is closed when the parking lights are illuminated.

The lighting and/or signaling circuit in which the right front parking light remains steadily illuminated when the second switch (S2L) is closed when the parking lights are illuminated.

The lighting and/or signaling circuit in which the left front parking light remains steadily illuminated when the third switch (S2R) is closed when the parking lights are illuminated.

These and other objects and advantages of the invention will be apparent from the following description, the accompanying drawings and the appended claims.

BRIEF DESCRIPTION OF THE ACCOMPANYING DRAWING FIGURES

FIG. 1 illustrates a generic vehicle of the prior art;

FIG. 2 illustrates schematically a prior art parking or daytime running lights and turn signal lights in exploded view of the vehicle shown in FIG. 1;

Figure 6:
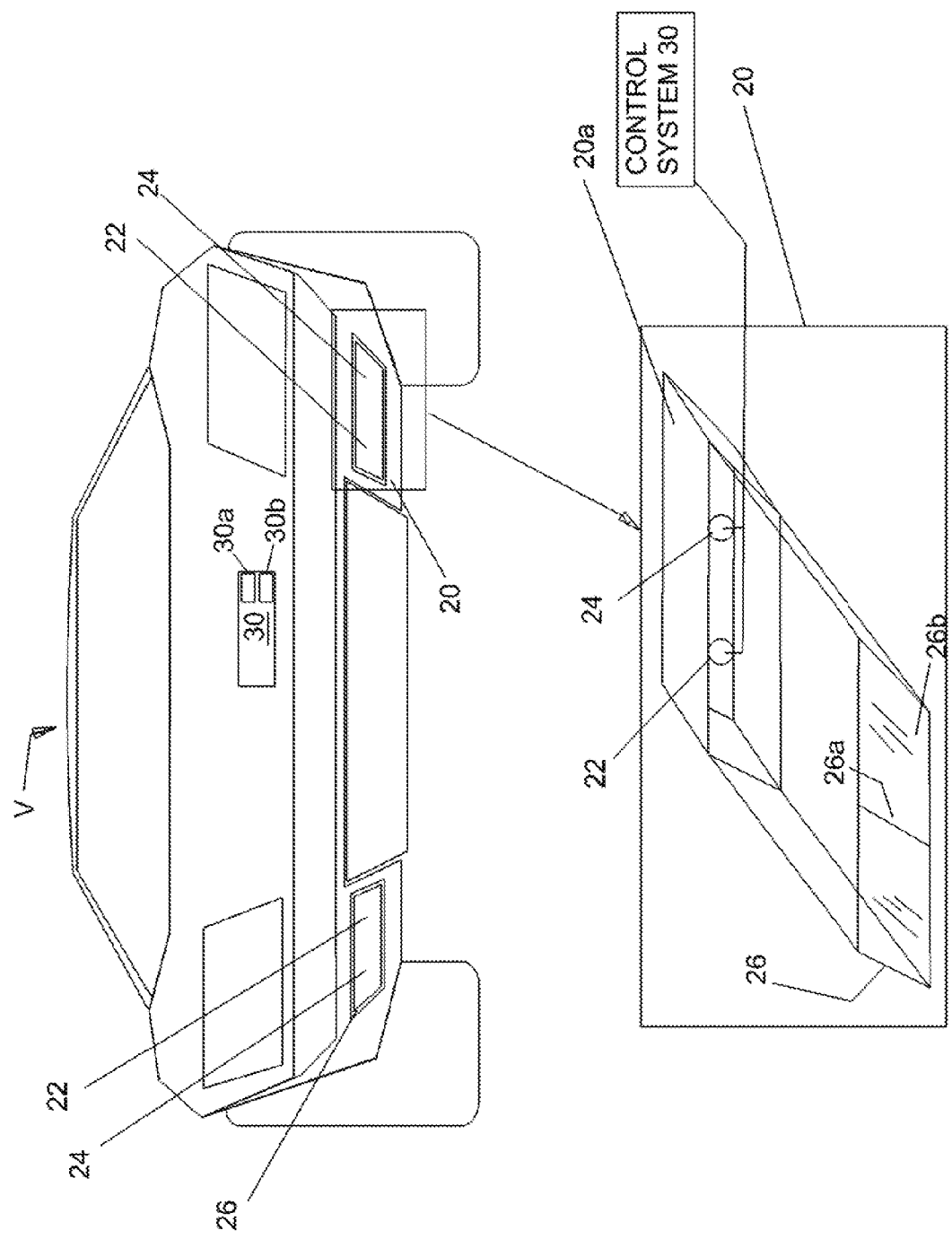
Figure 12:
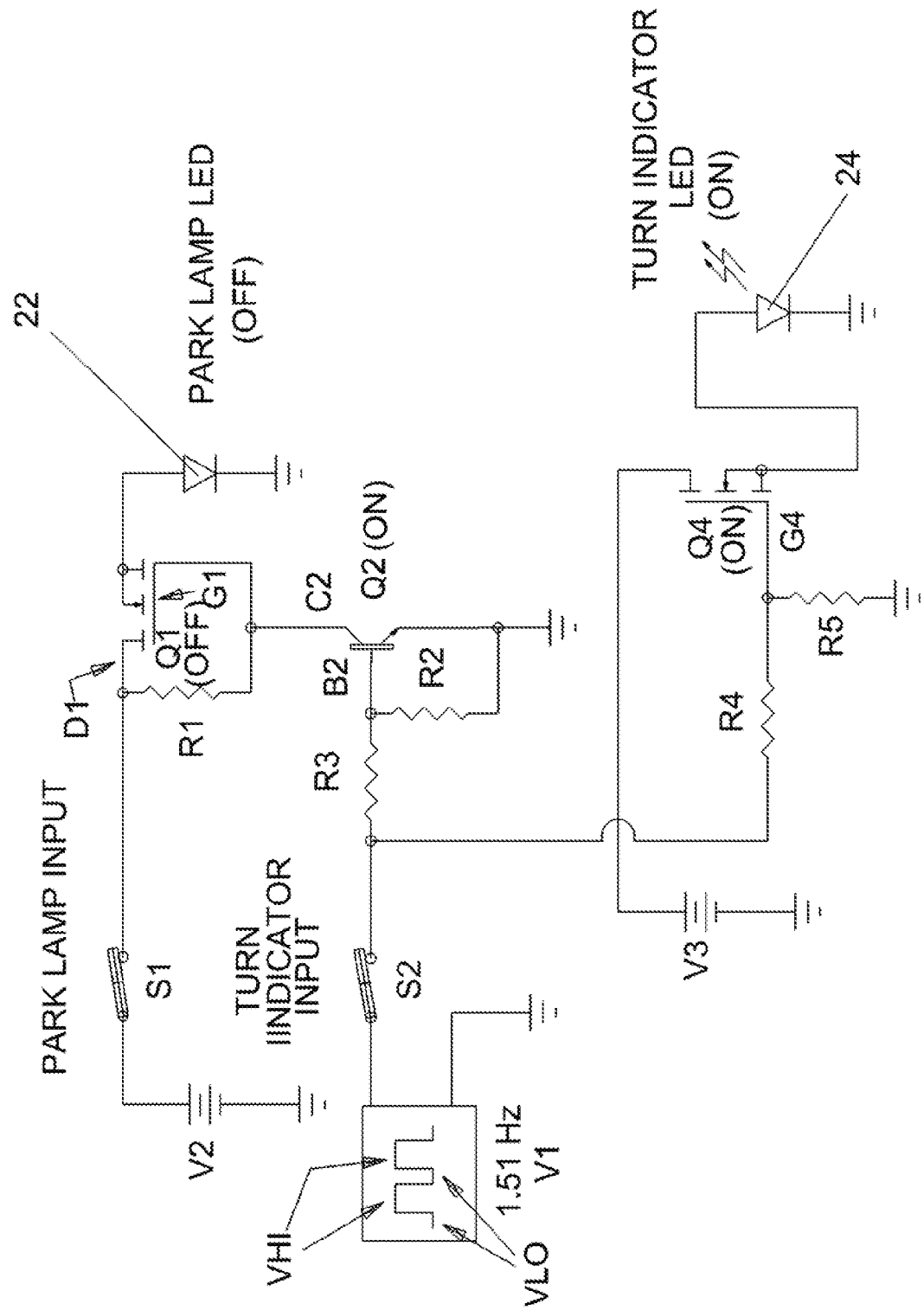
Figure 13:
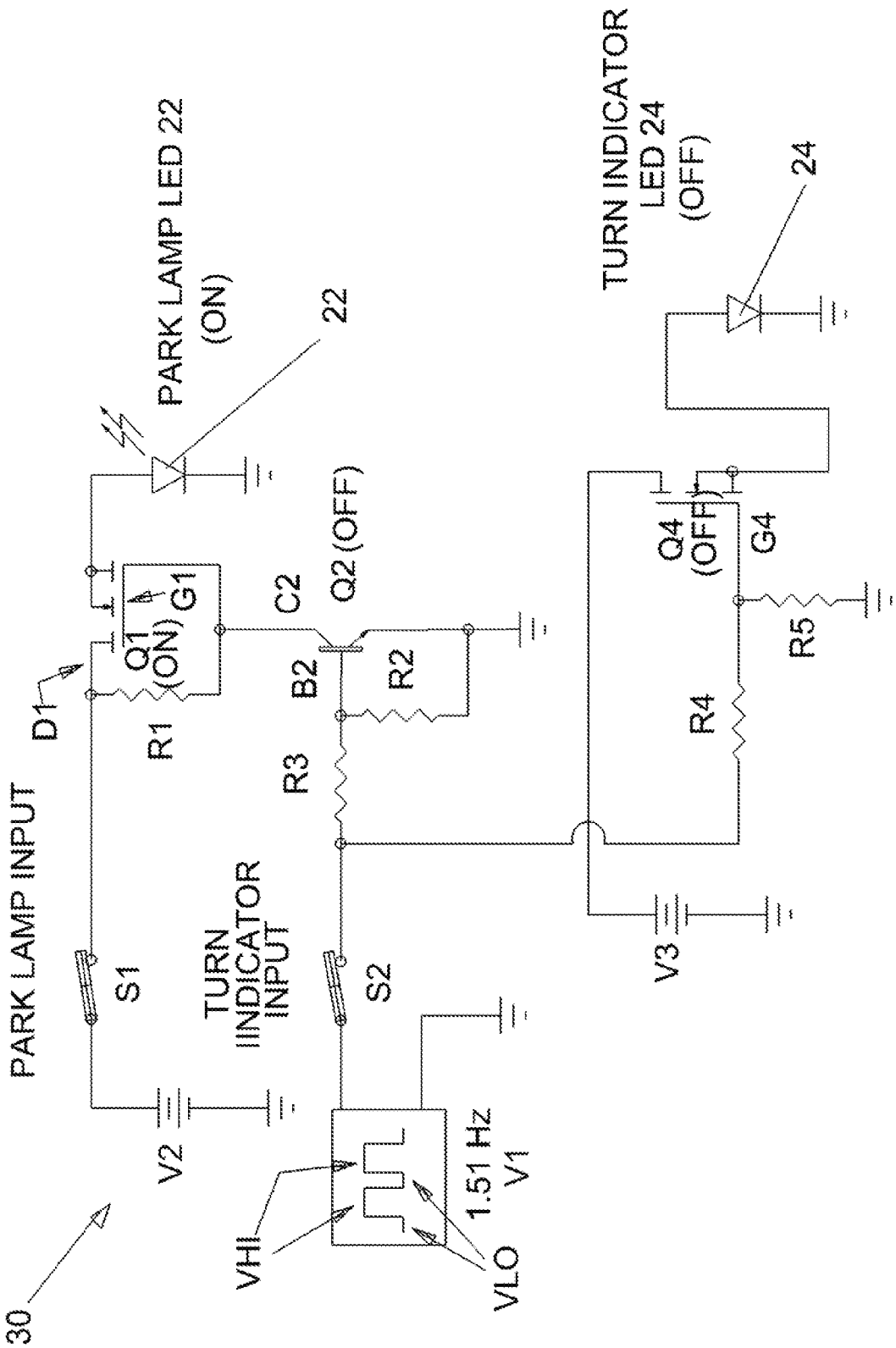
Figure 14:
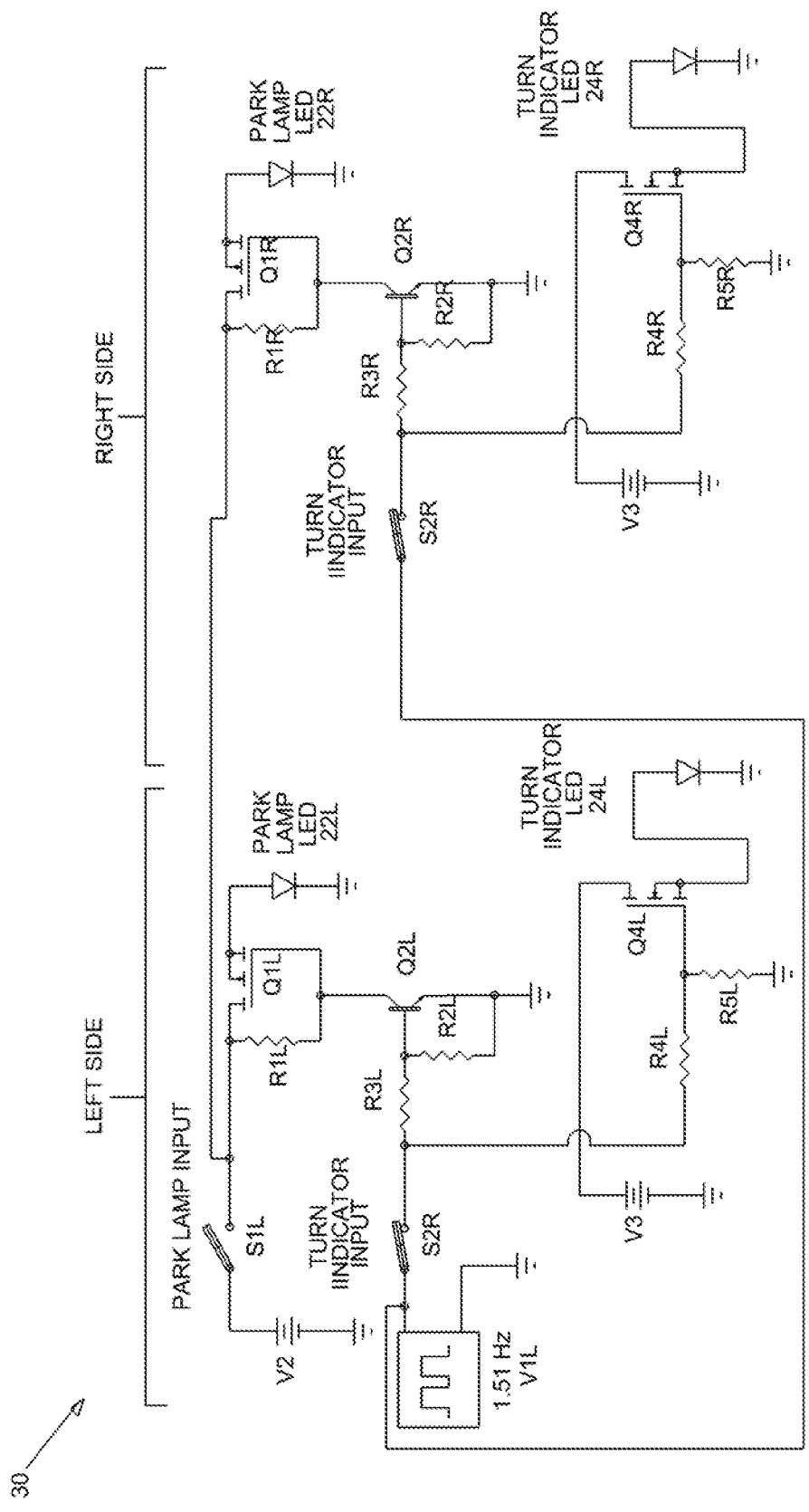

FIGS. 3A, 3B, 3C, and 3D illustrate a prior art sequence of flashing of lights of a prior art vehicle of FIG. 1;

FIGS. 4A, 4B, 4C, and 4D illustrates flashing of the lights under one embodiment of the invention;

FIGS. 5A, 5B, 5C, and 5D illustrate the flashing of FIG. 4 in isolation;

FIG. 6 illustrates one form of one embodiment of the invention in which DRL and turn signal light sources are contained within a single housing;

FIGS. 7A, 7B, 7C, 7D, and 7E illustrate the flashing of the park and turn signal light sources contained within the single housing as in FIG. 6;

FIG. 8 contains images A through D, which illustrate a sequence of flashing implemented by one form of the invention;

FIGS. 9A-13 illustrate an electronic circuit, in various conditions, which implements one form of the invention;

FIG. 14 illustrates how the circuits of FIGS. 9A-13 control lights on both the left and right sides of a vehicle;

FIG. 15 is a simplified view of FIG. 14 and compares it with the prior art;

FIGS. 16A and 16B is a truth table and timing diagrams, respectively, illustrating operation of one form of the invention; and FIG. 17 illustrates requirements of flashing times for turn signals in North America.

DETAILED DESCRIPTION OF THE PREFERRED EMBODIMENTS

An operation of one type of a prior-art turn signal will first be described in order to emphasize benefits achieved by the invention.

In brief, in FIG. 3B, a right-hand turn signal 6a flashes an amber light on and off while the two white parking or DRL lights 4 remain continuously illuminated. This event will be explained step-wise. In FIG. 3A, the vehicle 3 displays white parking or DRL lights 4, but no turn signal. In FIG. 3B, the right-hand turn signal 6a is momentarily illuminated and emits the amber light. The dilution described earlier may occur at this time.

Then, in FIG. 3C, the right-hand turn signal 6a temporarily goes dark between flashes. Next, in FIG. 3D, the situation of FIG. 3B is repeated, wherein the right-hand turn signal 6a is again illuminated. The sequence of FIGS. 3A through 3D continues until the turn by the vehicle 3 is completed and the turn signal is cancelled.

In contrast, the embodiments described herein provide control of the parking and DRL lights and turn signal lights in various embodiments or environments, such as when the lights are housed in separate housings (FIGS. 4A-4D) or when they are housed in a common housing as illustrated in FIGS. 6-9B Both illustrative embodiments will now be described. FIGS. 4A-4D illustrate operation of one embodiment of the invention and shows right parking or DRL light sources 10 adapted to generate white light in a vehicle V which are clearly separate from right turn signal lamp or light source 12 which is adapted to generate amber light. It should be understood, however, that these colors could be different if desired. Left parking or DRL light sources 14 and left turn signal light sources 16 are also provided. In brief, in FIG. 4B, when the turn signal or light source 12 is illuminated, it generates an amber color and the adjacent parking or DRL light source 10 does not generate the white light or different color. Then, when the amber turn signal or light source 12 is extinguished, the adjacent white parking or DRL light source 10 is re-illuminated. That is, the white parking or DRL light source 10 and the amber turn signal lamp or light source 12 are not illuminated together, but they alternate in white and amber emitting light, respectively. Thus, both the parking or DRL light source 10 and turn signal lamp or light source 12 flash, but alternating. The same functionality applies to the left-hand parking or DRL light source 14 and the left-hand turn signal lamp or light source 16.

However, this particular flashing of both the amber turn signal lamp or light source 12 and the adjacent parking or DRL light source 10 only occurs when the parking or DRL light source 10 is illuminated and a turn signal request occurs at the same time. At other times, when the parking or DRL light source 10 is illuminated, but no turn signal request is issued, the white parking or DRL light source 10 remains continuously illuminated in the usual manner. Alternatively, if the parking or DRL light source 10 is off and a turn signal request is issued, the turn signal light source 12 flashes in the conventional manner. Again, the left-hand parking or DRL light source 14 and turn signal light source 16 operate similarly.

To repeat, in one form of one embodiment of the invention, the amber light generated by the turn signal light source 12 in FIG. 3B and its adjacent white parking or DRL light source 10 are caused to flash alternately. That is, when the turn signal light source 12 is on, the adjacent parking or DRL light source 10 is off. Conversely, when the turn signal light source 12 is off, the adjacent parking or DRL light source 10 is on. The sequence will be explained step-wise.

Figure 4A:
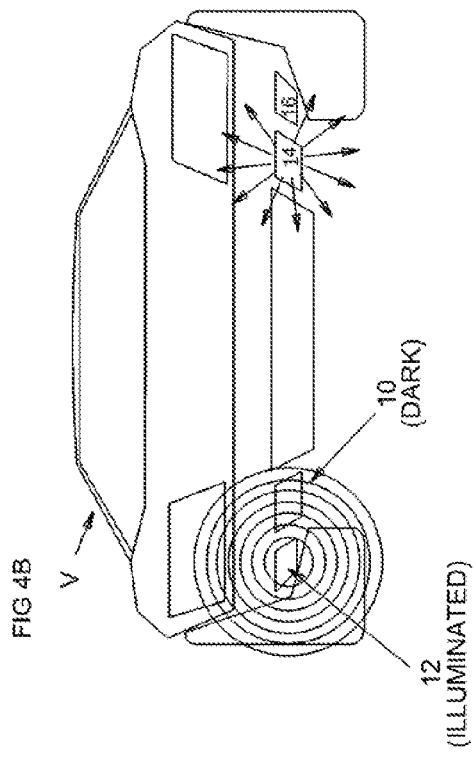
Figure 4B:
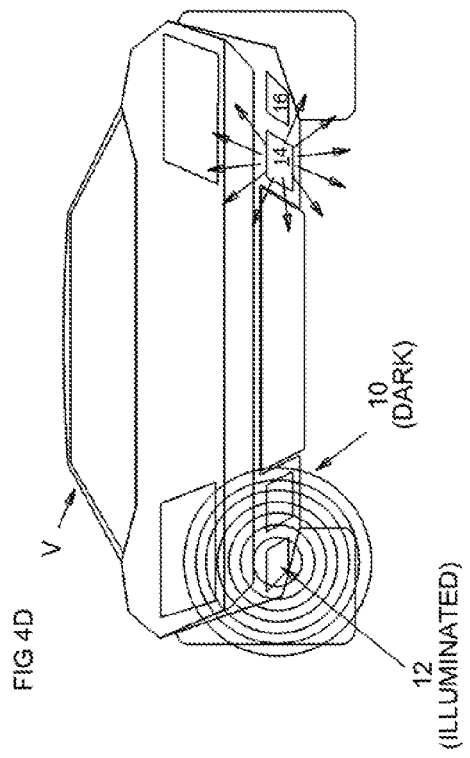
Figure 4C:
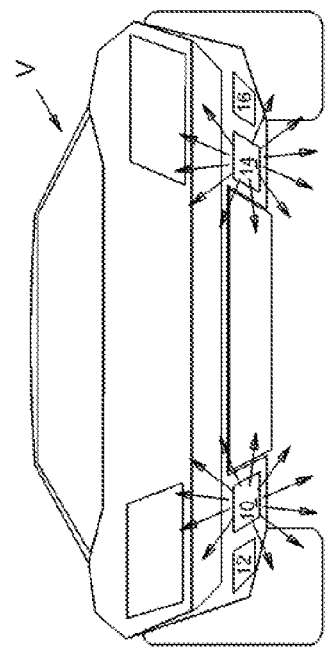
Figure 4D:
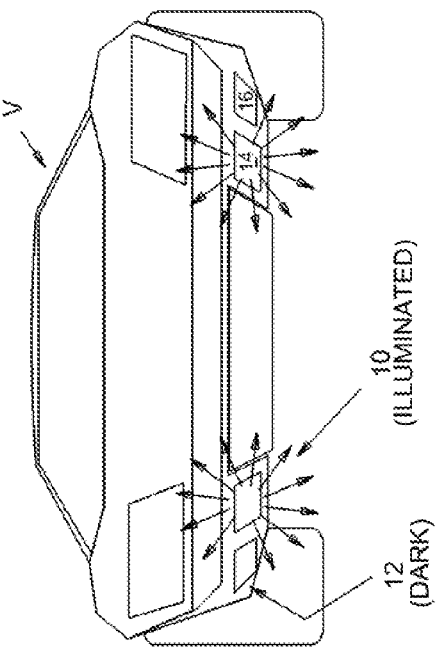

In FIG. 4A, the parking or DRL light source 10 generates white light and the parking or DRL light source 10 is continuously illuminated during normal operation of the vehicle V. In FIG. 4B, the right-hand turn signal light source 12 is momentarily illuminated when there is a call for a right-hand turn signal. At this time, one embodiment of the invention extinguishes or terminates the adjacent parking light, which is also located on the right-hand side of the vehicle V. Then, in FIG. 4C, the amber light from the right-hand turn signal light source 12 is extinguished, as occurs during normal flashing of a turn signal, the right-hand parking or DRL light source 10 generates white light and becomes illuminated. Then, as in FIG. 4D, when the right-hand turn signal light source 12 becomes illuminated again, as occurs during normal flashing, the amber light is generated, but the adjacent parking or DRL light source 10 is extinguished. The sequence of FIGS. 4A through 4D continues until the turn by the vehicle V is completed, and the turn signal is cancelled. The same sequence applies to the left-hand parking light or DRL light source 14 which generates white light and adjacent left-hand turn signal light source 16 which generates amber light.

It should be understood that during the sequence of FIG. 4A-4D, the opposite side parking or DRL light source remains illuminated at all times. In the example, the left-hand parking or DRL light source 14 remains illuminated continuously, and its adjacent turn signal light source 16 (FIGS. 4A-4D) remains dark at all times during activation of the right hand turn signal.

This alternate illumination of (1) the right-hand turn signal 12 and (2) its adjacent parking or DRL light 10 reduces or eliminates the dilution described above. Further, this operation gives the appearance that the parking light signal 10 remains continuously illuminated during the operation of the turn signal 12.

Figure 5B:
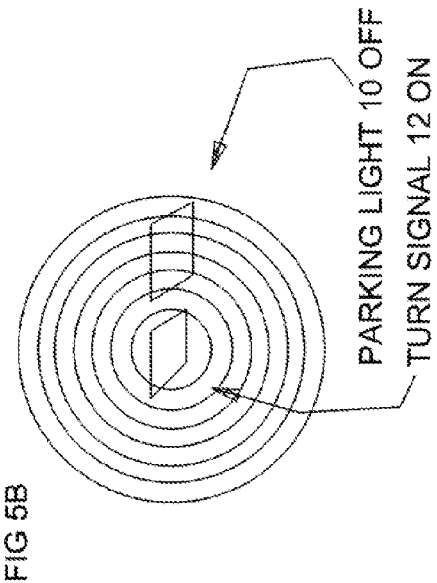
Figure 5D:
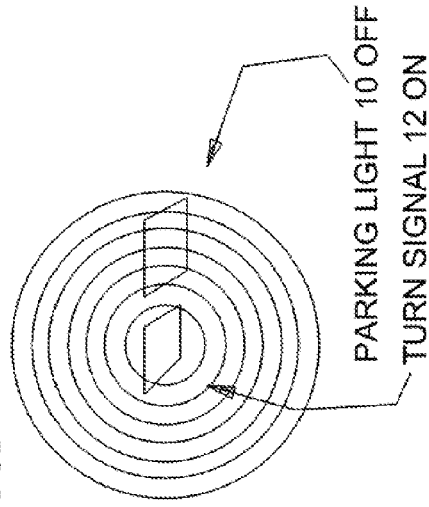
Figure 5A:
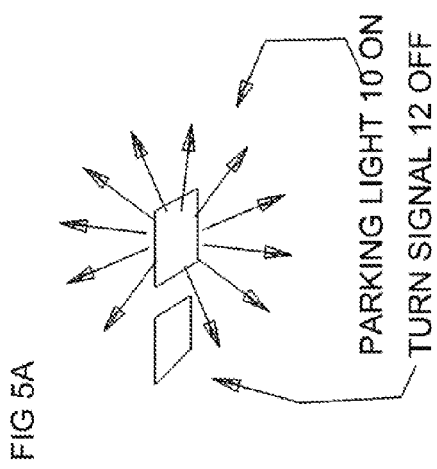
Figure 5C:
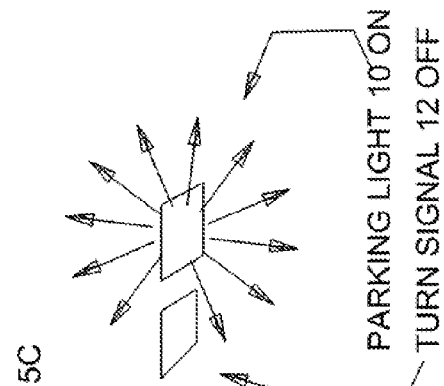

FIGS. 5A-5D illustrate the sequence of FIG. 4 in simpler terms using just the parking or DRL light sources 10 and turn signal light sources 12. In FIG. 5A, the turn signal light source 12 is off, and its adjacent parking or DRL light source 10 is on. In FIG. 5B, the turn signal light source 12 is on in response to a driver actuating a turn signal level or switch (not shown) inside the vehicle V. Note that when the turn signal light source 12 is on, its adjacent parking or DRL light source 10 is off. In FIG. 5C, the turn signal light source 12 is off, and the adjacent parking or DRL light source 10 is on. In FIG. 5D, the turn signal light source 12 is on, and the adjacent parking or DRL light source 10 is off. This sequence continues until the turn signal is cancelled.

The previous embodiment was described using a conventional parking or DRL light and turn signal housings (i.e., one for each function). FIGS. 6 and 7A-8 illustrate another form of an embodiment of the invention, wherein the parking light and turn signal light are not visibly separated and are housed in a common housing. A single lighting and/or signaling device 20 contains light sources 10 and 12 in the form of light-emitting diodes or LEDs 22 and 24, respectively, within a single housing 20a, which is covered by a conventional single lens 26. The parking or DRL LED 22 is white in color and acts as the parking light. LED 24 is amber in color to provide a turn signal, both as described above. In one embodiment, the light sources are two chips from a single LED (called bichip LED). According to another embodiment, each light source are a chip of a single LED (called monochip), LEDs being distinct from one other.

Alternately, two different separate or integral lenses (FIG. 6) can be used, separated at a divider 26a. Further, one lens or a portion 26b of the lens 26 that covers or is in front of the turn indicator LED 24 may be colored amber to act as a filter to generate amber light, even if a white diode were used as the turn indicator LED 24.

It is important to note that with the arrangement of FIG. 6, only a single housing 20a is required for this embodiment. Note also that the LEDs 22 and 24 are hidden behind the lens 26 and permit or facilitate a more global integration of lamp designs and, advantageously, a reduction in space required for the separate functions. For ease of illustration, a single LED 22 and LED 24 for each function is presented, but it should be understood that a plurality of LEDs may be used for each function.

Figure 7A:
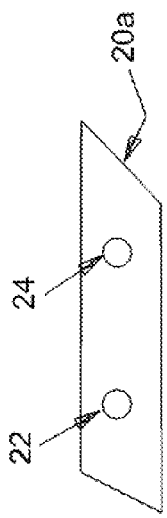
Figure 7C:
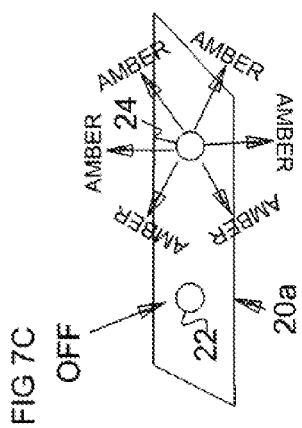
Figure 7E:
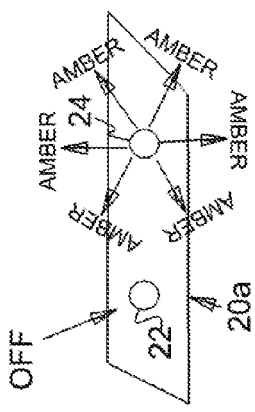
Figure 7B:
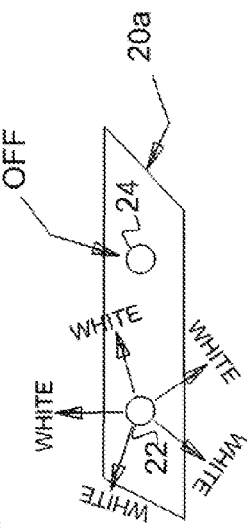
Figure 7D:
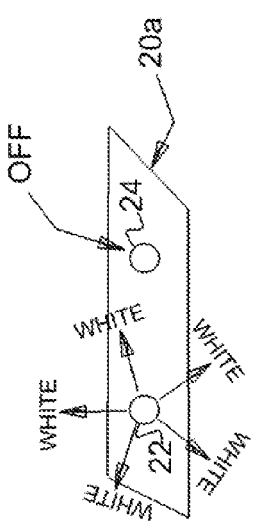

FIGS. 7A-7D illustrate in simplified form the single housing 20a and LEDs 22 and 24. During operation, the operation sequence shown in FIGS. 7B-7E occur. In FIG. 7B, the parking or DRL light source or LED 22 is illuminated, and generates light that is white. The turn signal light source or LED 24 is off at this time. In FIG. 7C, the parking or DRL light source or LED 22 is off, and the turn signal light source or LED 24 is illuminated and generates light that is amber in color. In FIG. 7D, the parking or DRL light source or LED 22 is illuminated and generates light that is white. The turn signal light source or LED 24 is off at this time. In FIG. 7E, the parking or DRL light source or LED 22 is off. The turn signal light source or LED 24 is illuminated and generates light that is amber in color.

FIG. 8 illustrates a significant feature of one embodiment of the invention. The turn signal, which is visually transmitted to other drivers, comprises two colors which alternate in time. The colors are white and amber in this case, and they can be viewed as time-multiplexed. This approach is different from an ordinary turn signal, which comprises a single flashing color.

In FIG. 8, the single-housing 20a approach of FIGS. 6 and 7A-7B is utilized. In FIG. 8, image A illustrates two white parking lights being projected or generated by the parking or DRL light source or LED 22 on each side of the vehicle V. In image B, a left-hand turn signal has been actuated by the driver, so the left-hand white parking light source or LED 22 is turned off and has been replaced by a display of the amber turn signal light generated by the turn signal light source or LED 24. Note that the amber light emanates from the same single housing 20a and lens 26 as the previous white parking light did.

In image C of FIG. 8, the amber light of image B is turned off and is replaced by the white parking or DRL light generated by parking or DRL light source or LED 22 which is energized. Then, in image D, the left-hand parking light generated by the parking or DRL light source or LED 22 is turned off and is replaced by the amber light generated by parking or DRL light source or LED 24 which is energized.

Therefore, in the sequence of FIG. 8, a turn signal on the left side of the vehicle V (as viewed by the driver), takes the form of a light which flashes white, then amber, then white, then amber, and so on. In contrast, an ordinary turn signal flashes, for example, amber, then nothing, then amber, then nothing, and so on. Of course, the right-hand turn signal or light source or LED 24 and parking or DRL light source LED 22 operate in the same manner in the illustrative embodiment.

A control system 30 implements the operation for the embodiments described above. FIGS. 6 and 9A-13 illustrate details of such a control system. Prior to explaining those FIGS. 6 and 9A-13, a simplified equivalent circuit or control shown in FIG. 9A, will first be explained for ease of understanding.

In FIG. 9A, a voltage source V2 represents the main battery of the vehicle V of FIG. 8. In FIG. 9A, switch S1 represents a parking light switch so that the parking or DRL light source 10 is always energized during predetermined conditions under control of the driver, and switch S2 represents a turn signal switch (not shown), which is commonly under the control of the operator of the vehicle and is typically on the left side of the steering wheel, at least in cars commonly used in the United States.

When the switch S1 is closed (for example, when the vehicle V is started or the driver actuates the parking lights) and switch S2 is open, the control circuit 30 in FIG. 8 causes switch Q1 in FIG. 9A to close, in a manner described later herein, thereby energizing parking or DRL light source or LED 22 to generate the white parking or DRL. The turn signal light source or LED 24 is not energized and remains dark.

When the switch S2 alone is closed, as when the driver actuates a turn signal, and switch S1 remains open, the control circuit 30 in FIG. 8 causes switch Q4 in FIG. 9A to close and open at a rate of about 1.51 Hertz (Hz). This causes the turn signal light source or LED 24 to flash at that same rate of about 1.51 Hz. The parking or DRL light source or LED 22 is not energized and remains dark during flashes of the turn signal light source or LED 24. The switch Q2 remains OFF because the switch S1 is open If both switches S1 and S2 are closed, as when the parking lights are on and the driver actuates a turn signal, the control circuit 30 causes switch Q1 to periodically open and close, and switch Q4 to assume the opposite state. That is, if Q1 is closed, then Q4 is open. If Q1 is open, then Q4 is closed and so on. This causes one, but not both, of either parking or DRL light source or LED 22 or the turn signal light source or LED 24 to illuminate. This alternate illumination is indicated and summarized by a plot or timing diagram TD in FIG. 16B. Switch Q2 in FIG. 9A assists this function to diphase the TI signal from DRL/PL therefore you have opposite state on DRL/PL signal detailed on FIG. 16B.

Figure 9B:
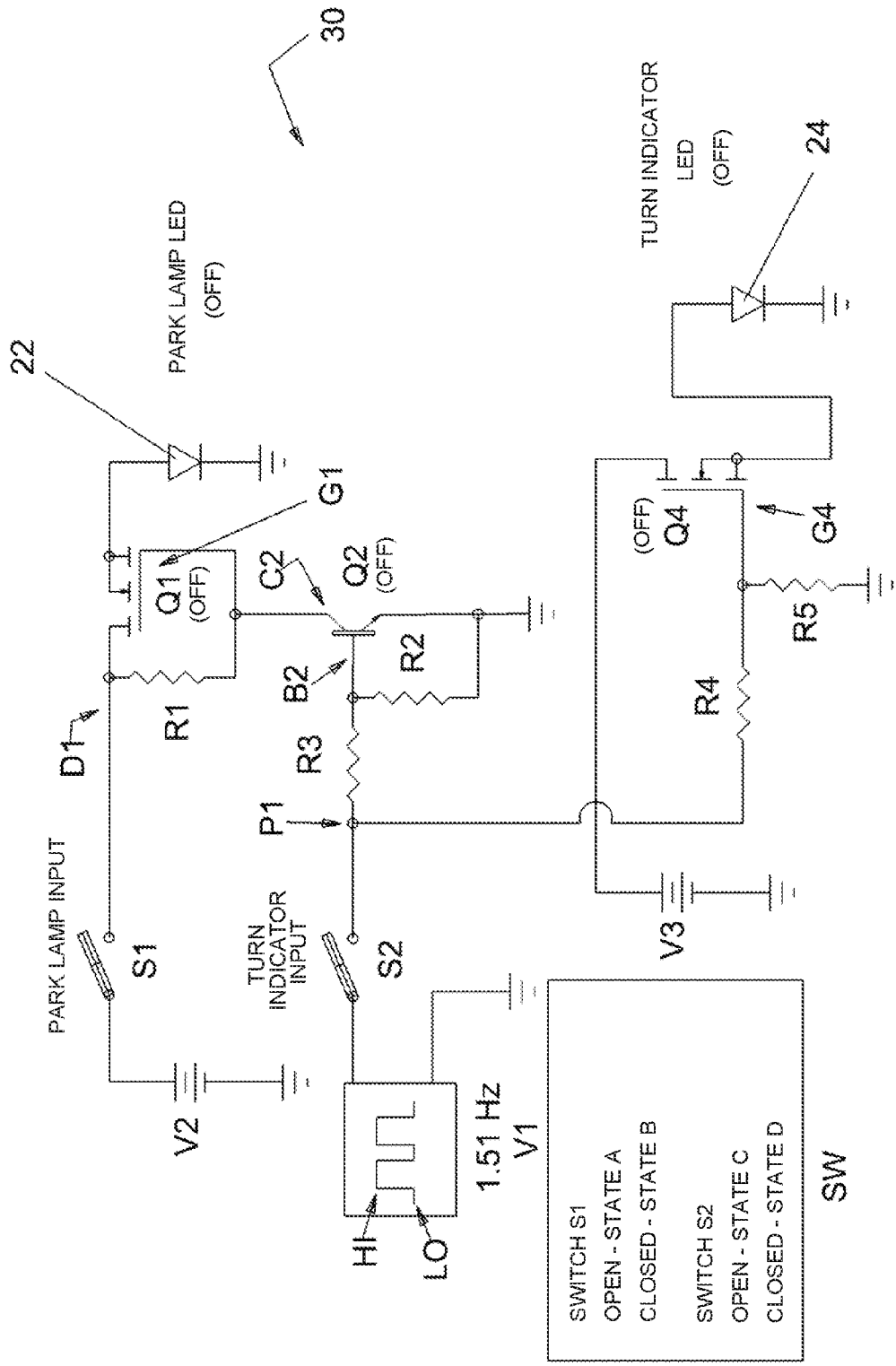

FIG. 9B shows the switches S1 and S2 of FIG. 9A. Block SW in FIG. 9B contains definitions, which will be utilized to facilitate understanding. As block SW shows, when switch S1 is open, it is defined as being in state A. When closed, switch S1 is defined to be in state B. When switch S2 is open, it is defined as being in state C, and when closed, switch S2 is defined as being in state D. For ease of understanding, reference is made to the parking or DRL light source or LED 22 only, but this description applies to the parking or DRL light sources 10 and 14 mentioned earlier. Hence, the description herein relative to the turn signal light source or LED 24 equally applies to the turn signal light sources 12 and 16.

In FIG. 9B, voltage sources V2 and V3 represent the main battery of the vehicle V. As in FIG. 9A, switch S1 controls the parking or DRL light source or LED 22. If that switch SI is open in FIG. 9B, then the drain D1 of Field Effect Transistor (FET) Q1 is floating, so no current can pass to the parking or DRL LED 22, which remains off, as indicated.

Transistor Q2, which is an NPN Bipolar Junction Transistor, BJT, does nothing at this time. It behaves as an open circuit because its base B2 is pulled to ground by resistor R2, which shuts off Q2. Also, its collector C2 is not applied to a source voltage at this time (because switch S1 is open), which means that no current can pass through the transistor Q2.

As in FIG. 9A, switch S2 controls the turn signal light source or LED 24. For simplicity, only a single switch S2 is shown. However, in practice, there are two such conventional switches, both identical in function. One controls the left-side turn signal, and the other controls the right-side turn signal. FIG. 14, later explained, provides an example of left and right side operation.

When switch S2 in FIG. 9B is open, as shown, the gate G4 of FET Q4 is pulled to ground by resistor R5, causing Q4 to act as an open circuit. No current flows through the turn signal light source or LED 24, so it is off.

Therefore, in FIG. 9B, switches S1 and S2, which are both open, cause both the parking or DRL light source or LED 22 and the turn signal light source or LED 24 to be off at this time.

In FIG. 10, switch S1 is closed. This pulls gate G1 of transistor Q1 to a higher voltage, thereby turning on Q1. In turn, this causes current 11 to flow through parking or DRL light source or LED 22. However, BJT Q2 is off because its base B2 is pulled low as explained earlier. This is true even though its collector C2 now has a voltage applied by way of resistor R1. In addition, FET Q4 is off, for the reasons explained in connection with FIG. 9B.

Therefore, at this time, with switch S1 closed and switch S2 open, the parking or DRL light source or LED 22 is ON and the turn signal light source or LED 24 is off.

In FIG. 11, an example of switch S2 being closed (i.e., a call for turn signal) and switch S1 open (indicating no parking or DRL lamp) will now be explained. As shown, switch S1 is open and switch S2 is closed in the example. FET Q1 is off because its drain D1 is floating as is its gate G1. The parking or DRL light source or LED 22 receives no current and is, therefore, off.

The closed switch S2 pulls the base B2 of BJT Q2 to a high voltage. However, since switch S1 is open, there is no voltage applied to collector C2 of BJT Q2, so BJT Q2 is off.

The closed switch S2 applies the train of voltage pulses indicated by V1 to the gate G4 of FET Q4. When a high pulse, VHI, is applied, transistor Q4 turns on, and the turn signal light source or LED 24 is pulsed to go on. When a low pulse, VLO, is applied, transistor Q4 turns off, terminating the current through turn signal light source or LED 24.

Therefore, in FIG. 11, the parking or DRL LED 22 is off, and the turn signal light source or LED 24 pulses or flashes on and off.

In FIG. 12, both switches S1 and S2 are closed. This will occur when the parking or DRL light source or LED 22 is illuminated, and the driver activates a turn signal by turning the turn signal lever (not shown) on the steering column (not shown). The circuit of FIG. 12 will reside in one of two conditions at this time, depending on whether VHI or VLO of voltage train V1 passes through switch S2.

Assume that VHI is passed through switch S2 in FIG. 12. VHI pulls the base B2 of BJT Q2 to a high voltage, thereby turning on BJT Q2. In turn, that pulls the collector C2 to a low voltage, thereby pulling the gate G1 of FET Q1 to a low voltage. This turns off FET Q1, so parking or DRL light source or LED 22 is turned off at this time.

Note that voltage VHI is also applied to the gate G4 of FET Q4, thereby turning on FET Q4, which turns on the turn signal light source or LED 24.

Therefore, in FIG. 12, when VHI of voltage train V1 is passed by switch S2, the parking or DRL light source or LED 22 is off and the turn signal light source or LED 24 is on.

In FIG. 13, it is assumed that VLO of voltage train V1 is passed by switch S2. That applies a low voltage to the base B2 of BJT Q2, thereby turning off BJT Q2, which turns off the turn indicator LED 24. In this regard, voltage VLO is also applied to the gate G4 of FET Q4 and pulls the gate G4 to a low voltage. This turns off FET Q4, thereby turning off turn indicator LED 24.

Now the gate G1 of FET Q1 is pulled to a high voltage, by way of resistor R1 being connected to voltage V2. This turns on FET Q1, thereby illuminating parking or DRL light source or LED 22.

Therefore, in FIG. 13, the parking or DRL LED 22 is pulsed on when the turn signal light source or LED 24 is pulsed off.

To repeat, when switches S1 and S2 are both closed, the situation alternates between that of FIG. 12 and that of FIG. 13. When parking or DRL light source or LED 22 goes or is pulsed on, the turn signal light source or LED 24 is off. When the latter turn signal light source or LED 24 goes or is pulsed on, parking or DRL light source or LED 22 is off.

From one point of view, in FIGS. 12 and 13, switches S1 and S2 both attempt to turn on their respective LEDs. Switch S1 attempts to turn on the parking or DRL light source or LED 22. Switch S2 attempts to turn on the turn signal light source or LED 24, but only when VHI is applied to switch S2. However, VHI turns off the transistor Q2, thereby turning off FET Q1.

Consequently, the event which turns on FET Q4, namely, the occurrence of VHI, serves to also turn off FET Q1, by turning on BJT Q2. So the parking or DRL light source or LED 22 and turn signal light source or LED 24 are forced into opposite states. When one is on, the other is off.

ADDITIONAL CONSIDERATIONS AND ADVANTAGES

1. A significant feature of one embodiment of the invention is that both lamps or LEDs 22 and 24 in FIG. 6 can be contained within the single housing 20a as shown in FIGS. 6-7E, compared with the dual-housing approach of the embodiment of FIGS. 4A-5D. This can reduce manufacturing and assembly costs. Further, the LEDs 22 and 24 can be more closely spaced together in the single housing 20a shown in FIG. 6 compared to the two housing approach shown in FIGS. 4A-5D, thereby reducing size and space requirements. This provides the result that, when the LEDs 22 and 24 alternate in illumination, they resemble a single flashing item through lens 26, which alternately produces white and amber light. This situation is contrasted with the embodiment of FIGS. 4A-5D wherein any analogous flashing would be perceived as a flashing light which jumps left and right between 10 and 12 (for a right-hand turn or 14 and 16 for a left-hand turn), similar to a so-called "wig-wag" crossing lights used at railroad crossings.

2. One characteristic of the single housing 20a in FIG. 6 is that two separate, independently operable, illumination assemblies (one pair on each side of the vehicle V) are not present or required, as in the prior art shown in FIG. 2.

3. It should be understood that the control system or circuit 30 of FIGS. 9A and 9B will control, for example, the turn signal on the left side of the vehicle V and the parking light or DRL also on the left side of the vehicle V. That is, LED 22 is located on the left side, as is LED 24. The identical control system or circuit 30 controls the turn signal and parking light or DRL on the right side of the vehicle V. These two control systems are represented separated by blocks 30A and 30B in FIG. 6. It should be understood that the control system or circuit 30 may be a separate component integrated on the same printed circuit board as the control circuit components (not shown) in each light housing, such as light housing 20a. Alternatively, the control system or circuit 30 could be provided on a separate printed circuit board mounted with other vehicle electronics (not shown), such as with conventional turn signal electronics.

4. Although preferred, the single-lens, single housing 20a approach of FIG. 6 is not required. The dual-housing system of FIGS. 4A-5D can be used with the embodiments of the invention.

5. FIG. 14 illustrates the components labeled as LEFT SIDE are analogous to those described in FIGS. 9A-13 and operate similarly. Those components control light sources or LEDs 22L and 24L, which are on the left side of the vehicle V. The components labeled RIGHT SIDE control light sources or LEDs 22R and 24R, which are on the right side of the vehicle V.

There are at least two differences between the LEFT SIDE and RIGHT SIDE components. One is that switch S1 is eliminated from the RIGHT SIDE. Switch S1L controls both light sources or LEDs 22L and 22R.

A second difference is that no additional voltage train V1 (as shown in FIGS. 9B-13) is shown on the RIGHT SIDE. A single voltage train V1L is provided. It is used by the LEFT SIDE or the RIGHT SIDE components when needed, but not both at once.

In FIG. 14, switch S1L turns both park lamp LEDs on and off in the manner described earlier relative to FIGS. 9B-13. If switch S1L is off or open, then (1) switch S2L operates the left turn signal light source or LED 24L, and (2) switch S2R operates the right turn signal light source or LED 24R, in the manner described earlier relative to FIGS. 9B-13. If switch S1L is on or closed, then if switch S2L is closed, the left parking or DRL light source or LED 22L flashes alternately with the left turn signal light source or LED 24L in the manner described earlier. The right parking or DRL light source or LED 22R is illuminated continuously and right turn signal light source or LED 24R is off.

If switch S1L is closed and if switch S2R is closed, the right parking or DRL light source or LED 22R flashes alternately with the right turn signal light source or LED 24R. Note that the left parking or DRL light source LED 22L is illuminated continuously and left turn signal light source or LED 24L is off.

During normal operation, an interlock IL in FIG. 15 is generally provided to prevent turn indicator switches S2L and S2R from being actuated simultaneously because simultaneous actuation would imply issuance of a simultaneous turn in both the left and right directions. In contrast, if a hazard warning signal were initiated, the hazard warning signal would flash both sides at the same time.

The apparatus of FIG. 14 prevents a parking lamp LED from illuminating at the same time as its adjacent turn signal LED. For example, if left turn signal light source or LED 24L is energized or illuminated, then the circuit 30 prevents left parking or DRL light source or LED 22L from illuminating simultaneously. Those two light sources or LEDs 22L and 24L are required to illuminate or flash alternately at different times as explained earlier.

6. For ease of understanding, FIG. 15 includes a simplified representation of FIG. 14. The bracket labeled PRIOR ART indicates that LEDs PL and SL are controlled independently by respective switches SA and SB. (In practice a relay or equivalent, not shown, may be interposed between a switch and the LED, to handle a large current.) That is, the operation of switch SB does not affect the illumination of LED PL. They are independent.

In contrast, the embodiments being described provide the control system and circuit 30 within the bracket labeled 30. The control system and circuit 30 makes the operation dependent as explained above. For example, the left park lamp LED, labeled PL-L, cannot operate independently from the left turn signal LED, labeled SL-L. Further, because of the interlock IL, the left turn signal LED, labeled SL-L, cannot operate independently of the right turn signal LED, which is labeled SL-R.

7. FIG. 16A is a truth table that summarizes the different operational states and illustrates one type of dependency in the operation. When both switches S1 and S2 in FIG. 9A are open, both LEDs 52 and 53 are off, as FIG. 16, top row, indicates.

As illustrated in the second row of FIG. 16, when switch S1 is open and switch S2 is closed, the appropriate turn signal flashes and no parking lights are displayed.

As the third row of FIG. 16 indicates, when switch S1 is closed and switch S2 is open, the parking or DRL lights go on, but no turn signal illuminates.

As the last row in FIG. 16 indicates, when both switches S1 and S2 are closed, the appropriate turn signal light source or LED 24 alternates with its adjacent parking light source or LED 22. It should be understood that the non-adjacent parking light source or LED 22 illuminates continuously and the other turn signal light source or LED 22 is off.

8. FIG. 17 illustrates the range of flash rates for a turn signal allowed in North America. This illustrates that a primary factor which would be allowed to change is the flash rate/frequency of the turn signal, which would affect the countering flash of the parking or DRL light source throughout the duration of the turn signal.

This invention, including all embodiments shown and described herein, could be used alone or together and/or in combination with one or more of the features covered by one or more of the claims set forth herein, including but not limited to one or more of the features or steps mentioned in the bullet list in the Summary of the Invention and the claims.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting and/or signaling device for a motor vehicle, comprising:
    at least one first light source for producing a first colored light and at least one second light source;
    a control system which:
        energizes said at least one second light source to produce a blinking or pulsing light in response to a switch or lever being actuated, said blinking or pulsing light having a light on period and a light off period; and
        energizes said at least one first light source to produce said first colored light during said light off period and does not energize said at least one second light source during said light off period;
    wherein said at least one first light source comprises a plurality of white parking or DRL light sources at a front of the vehicle;
    wherein said at least one second light source comprises a plurality of amber light sources, at least one of which is adjacent each of said plurality of white parking or DRL light sources; and
    a visual signal is produced by alternately flashing one of said plurality of white parking or DRL light sources with its adjacent one of said plurality of amber light sources.

2. The lighting and/or signaling device as recited in claim 1, wherein said at least one first light source and said at least one second light source both comprise at least one semiconductor light source.

3. The lighting and/or signaling device as recited in claim 1, wherein said at least one first light source does not produce said first colored light when said at least one second light source produces a second colored light and said second light source does not produce said second colored light when said first light source produces said first colored light.

4. A lighting and/or signaling device for a motor vehicle having a turn signal actuator, operable by a driver of the vehicle, to generate a turn indicator light, said lighting and/or signaling device comprising:
    a plurality of front parking or DRL lights, each of which (1) emits a first colored light, and (2) is located adjacent a respective turn signal light that emits said turn indicator light of a second color that is different from said first colored light:
    a control system which causes said turn signal light to flash alternately with its adjacent parking or DRL light;
    wherein at least one of said plurality of front parking or DRL lights comprises a plurality of white parking or DRL light sources at a front of the vehicle;
    wherein said turn signal light comprises a plurality of amber light sources, at least one of which is adjacent each of said plurality of front parking or DRL lights; and
    a visual signal is produced when said control system alternately flashes one of said plurality of front parking or DRL lights with its adjacent one of said plurality of amber light sources.

5. The lighting and/or signaling device as recited in claim 4, wherein each of said plurality of said front parking or DRL light sources comprises at least one LED that generates a white light; and
    said turn signal light being an LED that generates an amber light;
    said control system alternately flashing said first colored light from said parking or DRL light source and its adjacent turn indicator light.

6. The lighting and/or signaling device as recited in claim 4, wherein said parking or DRL light source does not produce said parking or DRL light when said turn signal light produces said turn indicator light and said turn signal light does not produce said turn indicator light when said parking or DRL light source produces said first colored light.

* * * * *